Oct. 26, 1965     E. F. PLATZ     3,213,968
TRANSVERSELY MOVABLE, POSITIVE LOCK BRAKE
Filed March 23, 1964     4 Sheets-Sheet 2
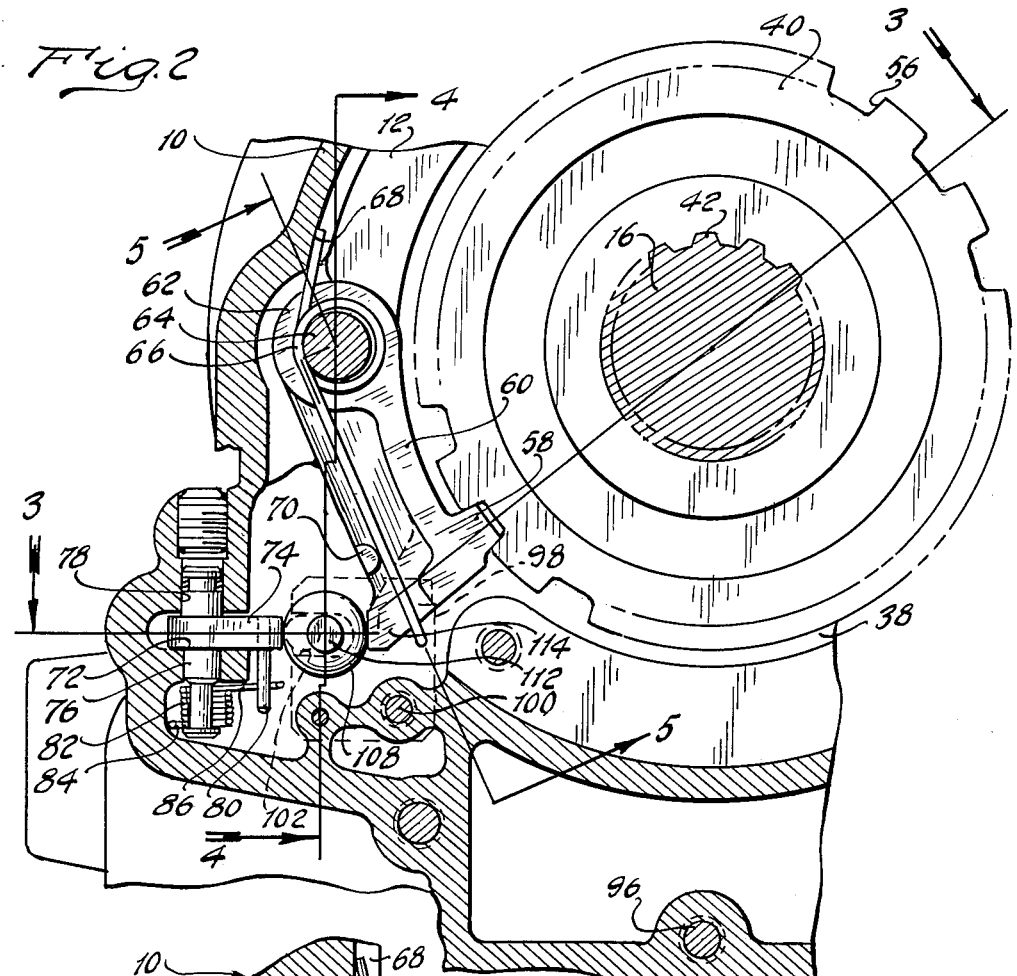
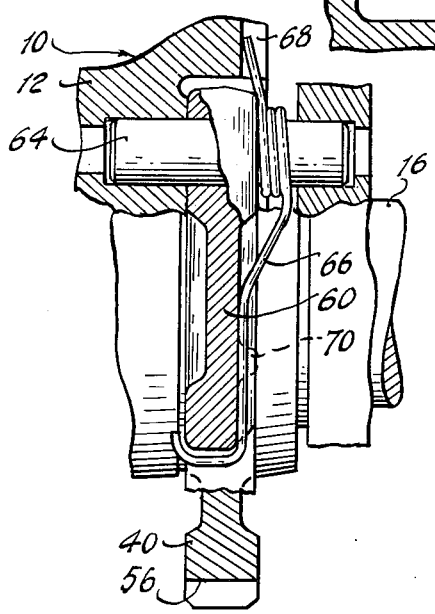
INVENTOR:
EDWARD F. PLATZ
BY
ATTORNEYS.

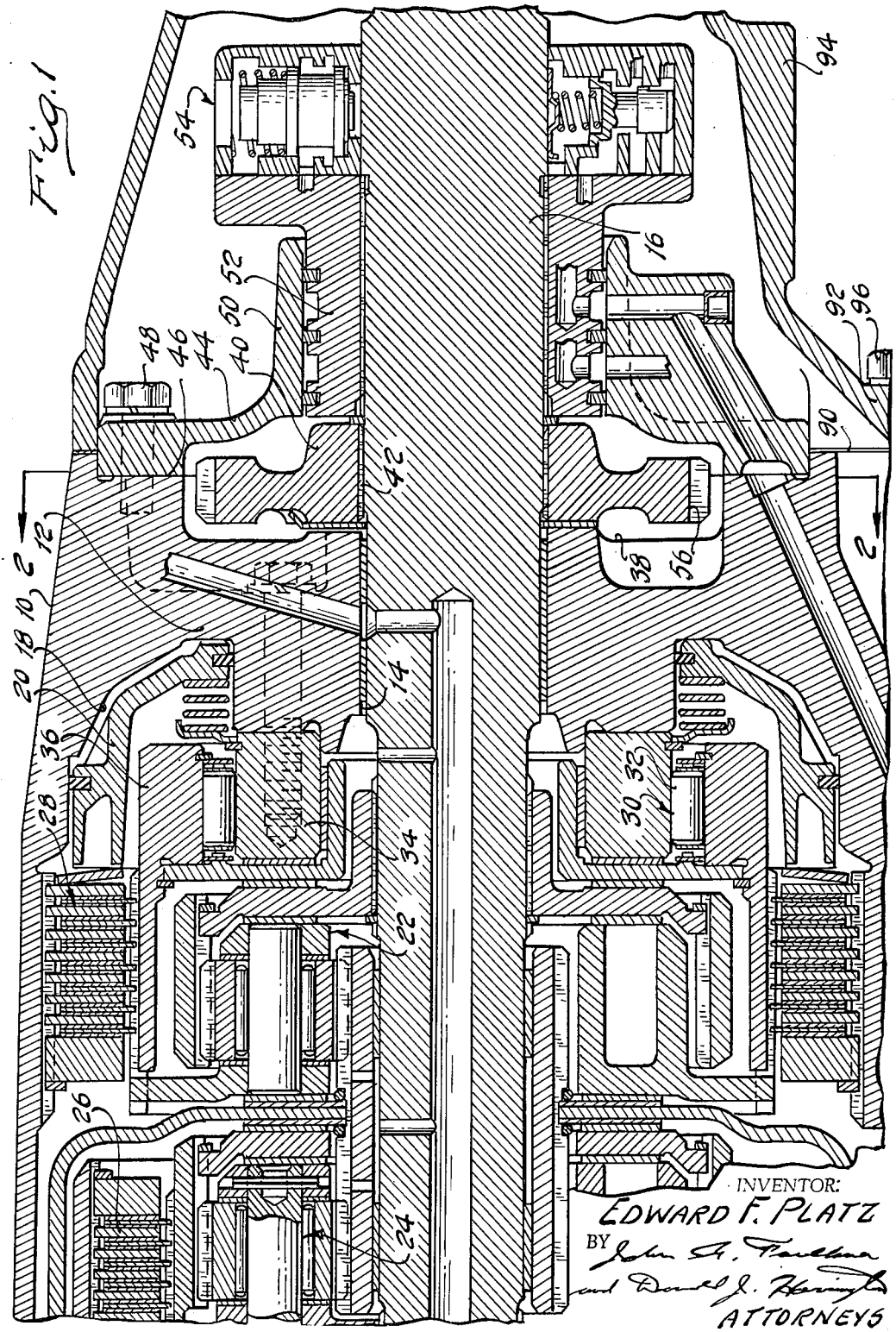

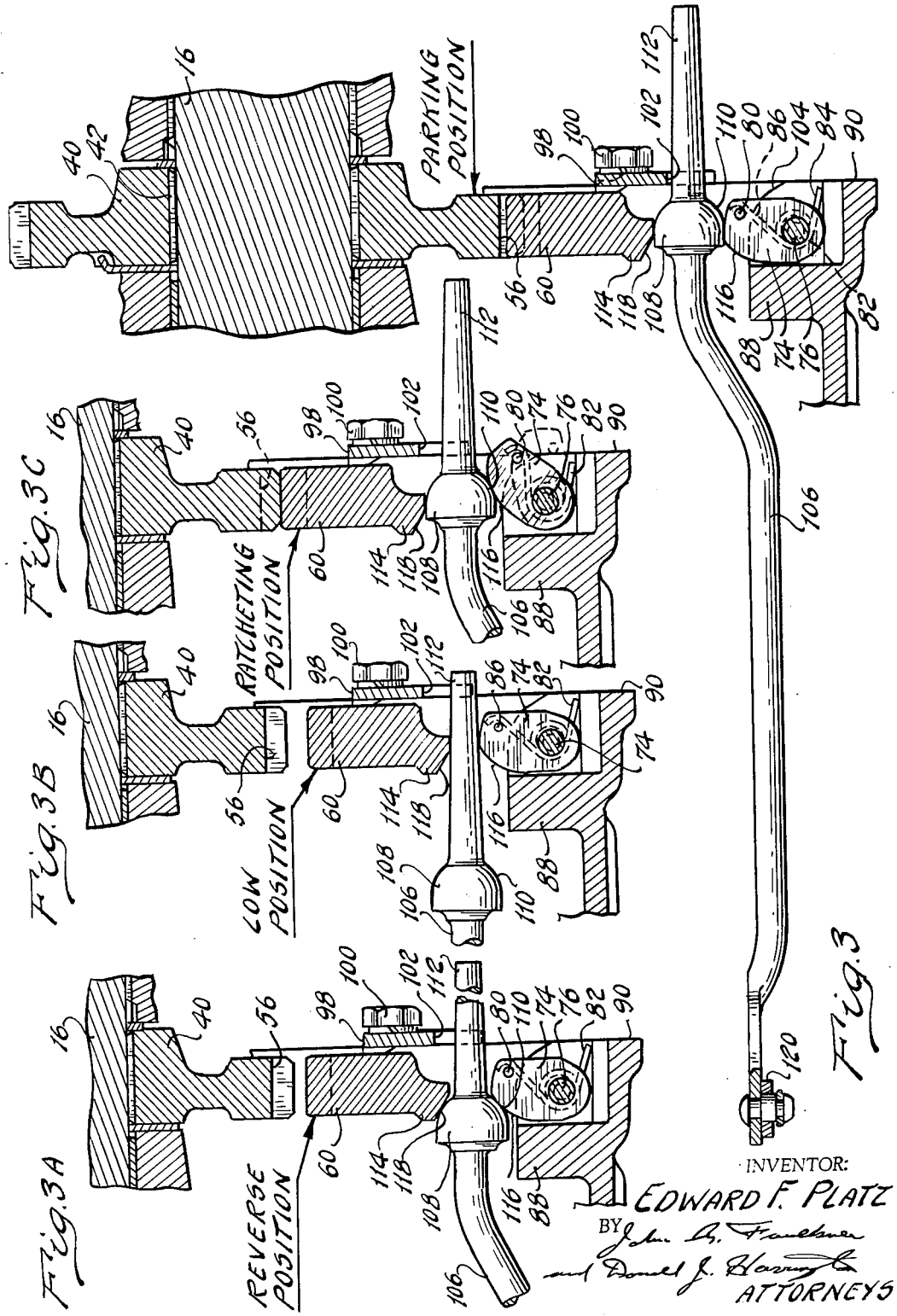

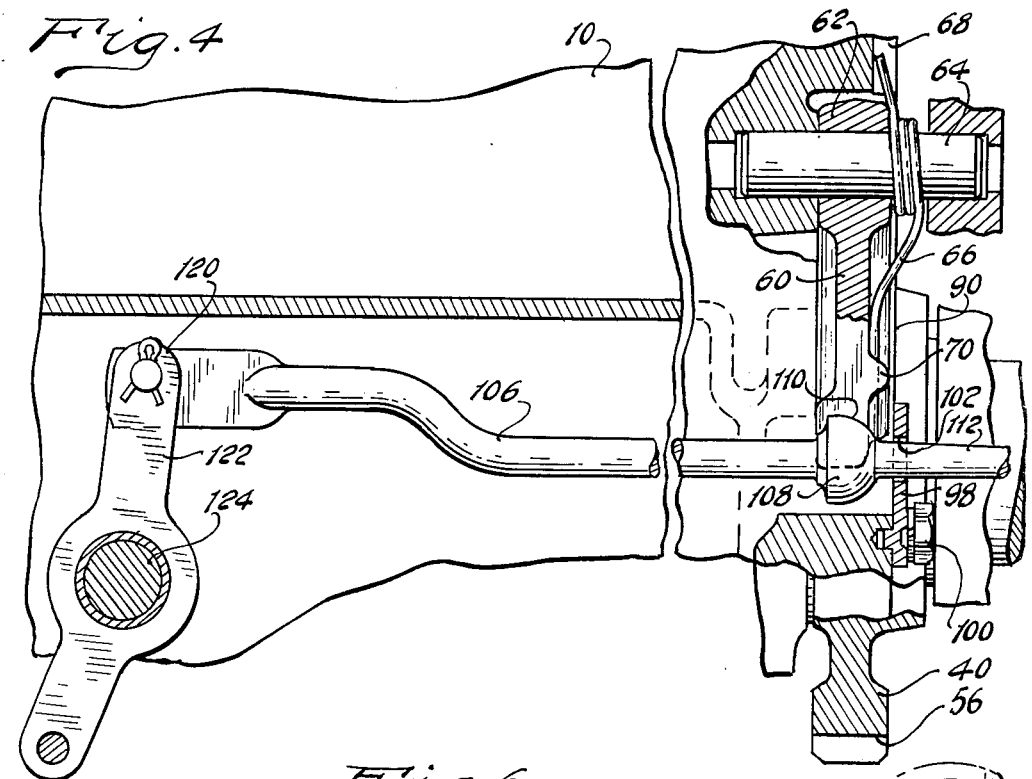
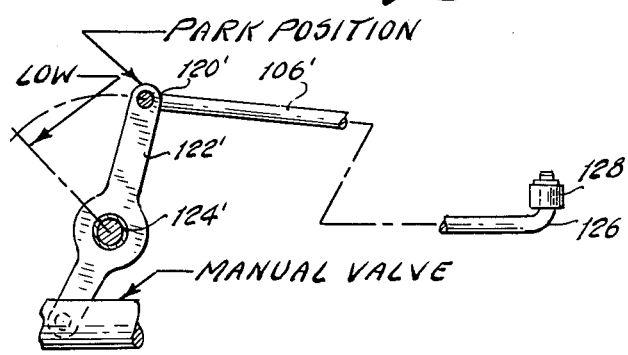
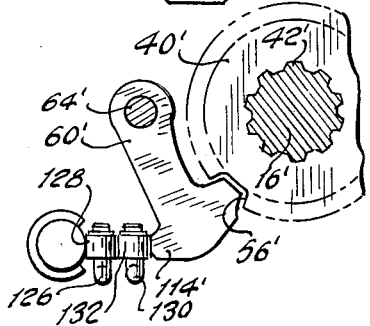
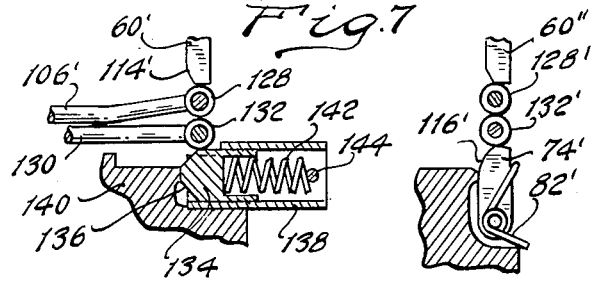

United States Patent Office 3,213,968
Patented Oct. 26, 1965

3,213,968
TRANSVERSELY MOVABLE, POSITIVE
LOCK BRAKE
Edward Francis Platz, Detroit, Mich., assignor to Ford
Motor Company, Dearborn, Mich., a corporation of
Delaware
Filed Mar. 23, 1964, Ser. No. 353,868
6 Claims. (Cl. 188—69)

My invention relates generally to positive acting brake mechanisms, and more particularly to improvements in a parking brake capable of anchoring the driven shaft of an automatic power transmission mechanism in an automotive vehicle driveline.

The brake of my invention is adapted especially to be used in an automotive vehicle power transmission mechanism having a hydrokinetic unit and a planetary gear system. Friction clutch and brake elements usually are employed for controlling the relative motion of the elements of the gear system to establish forward drive and reverse drive power flow paths from the vehicle engine to the driven member of the transmission mechanism. The turbine of the hydrokinetic unit is connected drivably to power input portions of the planetary gear system and the impeller of the hydrokinetic unit is connected drivably to the vehicle engine.

With one or more of the friction coupling members of the planetary gear system actuated, turbine torque developed by the hydrokinetic unit is delivered during forward drive operation through the torque delivery path defined by the planetary gear system to the driven member and hence to the vehicle traction wheels. When the engine is stalled, however, the hydrokinetic unit is ineffective to deliver to the engine the braking torque that is necessary to hold the driven member of the transmission mechanism stationary. Furthermore, when the friction clutch and brake elements of the planetary gear system are disabled—which usually is the case in automotive vehicle driveline installations when the vehicle engine is inoperative—the torque delivery path between the driven member and the hydrokinetic unit is interrupted. Thus, it is desirable to provide a positive acting brake that is under the control of the vehicle operator for anchoring the driven member while the vehicle is parked with the engine inactive or while the torque delivery path through the planetary gear system is interrupted regardless of whether the engine is idling or is stalled.

It is usual practice to provide a driver operated mechanical linkage mechanism for engaging and disengaging the parking brake pawl that cooperates with the parking gear carried by the driven member. This same mechanical linkage mechanism also is used for controlling a selector valve that is used to select any desired range of operating speed ratios in the planetary gear system. The selector valve forms a part of an automatic control valve arrangement that responds to operating variables to engage and disengage the friction coupling members of the planetary gear system to condition it for a variety of operating requirements.

It is an object of my invention to provide a positive acting parking brake mechanism in an environment of this type wherein provision is made for reducing to a desirable minimum the driver effort that is necessary to control the movement of the parking brake pawl as it engages and disengages its associated parking gear.

It is a further object of my invention to provide a parking brake mechanism that requires a minimum amount of effort during operation and which is characterized also by its reduced space requirements.

It is a further object of my invention to provide a parking brake mechansim of the type above set forth wherein provision is made for introducing a lost motion feature into the linkage mechanism of which the parking pawl forms a part so that it can be moved to the normal parking position regardless of whether the pawl itself is aligned properly with the teeth of the associated parking gear.

It is a further object of my invention to provide a mechanism of the type above set forth wherein provision is made for spring biasing the pawl toward a driven member braking position in those instances when the linkage mechanism for the brake mechanism is actuated by the operator while the pawl is misaligned with respect to the teeth of the associated parking brake gear.

Further features and objects of my invention will become apparent from the following description and from the accompanying drawings, wherein:

FIGURE 1 shows in longitudinal cross sectional form a portion of an automatic power transmission mechanism of which my improved parking brake forms a part;

FIGURE 2 is a transverse cross sectional view taken along the plane of section line 2—2 of FIGURE 1;

FIGURE 3 is a partial assembly view showing the details of the parking brake mechanism of my invention and is taken along the plane of section line 3—3 of FIGURE 4;

FIGURES 3A, 3B and 3C show portions of the mechanism of FIGURE 2 in different operating positions;

FIGURE 4 shows in elevation a portion of the linkage mechanism of FIGURE 3 and is taken along the plane of section line 4—4 of FIGURE 3;

FIGURE 5 is a partial cross sectional view taken along the plane of section line 5—5 of FIGURE 2; and FIGURES 6 through 9 show two modified forms of my invention.

Referring first to FIGURE 1, numeral 10 designates a transmission housing that contains the planetary gear system and the hydrokinetic unit of the transmission mechanism. It may be bolted or otherwise secured to the engine block of an internal combustion vehicle engine in known fashion.

The housing 10 includes an end wall 12 having an opening 14 through which a driven shaft 16 is journaled. The shaft 16 which forms a power output member of the transmission mechanism, may be connected drivably to the vehicle traction wheels through a suitable driveline in known fashion. An annular cylinder 18 formed in the wall 12 receives an anular piston 20.

A planetary gear unit shown generally at 22 and a companion planetary gear unit shown generally at 24 form torque delivery paths between the turbine of the hydrokinetic torque converter unit and the shaft 16. The relative motion of the elements of the gear units is controlled in part by multiple disc friction clutch structure 26. Similarly, a reaction point for the elements of the gear units is provided by a multiple disc brake 28 that can be engaged and released by means of a servo defined in part by piston 20. A fluid pressure operated servo for engaging and releasing the clutch 26 also is provided although it is not illustrated.

An overrunning coupling in the form of a one-way brake 30 supplements the action of friction disc brake 28. It includes overrunning brake elements 32 situated between a boss 34 carried by the wall 12 and an outer race 36 that forms a part of the friction brake structure.

The overrunning coupling 30 is capable of accommodating driving torque reaction during torque delivery from the turbine to the driven shaft 16 but is incapable of functioning as a reaction element to establish a torque delivery path for delivering torque from the shaft 16 to the engine or to the stationary housing 10.

The wall 12 can be formed with a recess 38 that receives a parking brake gear 40. This gear is splined at 42 to the shaft 16.

Recess 38 encloses the gear 40 and is covered by means of an end plate 44 which is bolted at its periphery to a shoulder 46, suitable bolts 48 being provided for this purpose.

A stationary sleeve extension 50 surrounds shaft 16. It receives a pressure delivery manifold 52 which forms a part of a governor valve assembly indentified generally by reference character 54. This governor valve assembly forms a part of the automatic control valve system, not shown The teeth 56 of the gear 40 are adapted to be engaged by a pawl tooth 58 as best seen in FIGURE 2. Tooth 58 is carried by a pawl lever 60 having a base portion 62 in the form of an eyelet. The opening formed in base portion 62 receives a mounting pin 64 which in turn is end supported within a cooperating opening formed in the stationary housing 10. The axis of the pin 64 is parallel to the axis of the shaft 16.

A pawl lever return spring 66 is wound about the pin 64 and one end thereof engages an adjacent boss formed on the housing 10 as best indicated at 68. The other end of the spring 66 engages a projection 70 situated at a point on the lever 60 that is radially spaced from the axis of pin 64. Spring 70 is provided with a preload so that the lever 60 normally is urged in a clockwise direction as viewed in FIGURE 2 thereby tending normally to move the tooth 58 out of engagement with the teeth 56 of the parking gear 40.

Housing 10 is formed with slotted opening 72 within which is received a ratchet lever 74. This lever is journaled for rotation about the axis of a supporting pin 76 that is received within an opening 78 formed in housing 10. The opening 78 extends vertically, as viewed in FIGURE 2, and it is internally threaded to accommodate a threaded end plug.

The ratchet lever 74 carries a pin 80 which extends downwardly therefrom as viewed in FIGURE 2. A ratchet spring 82 is wound about one end of the shaft 76. One end of the spring engages the adjacent portion of the housing 10 as indicated at 84. The other end of the spring 82 engages the pin 80 as indicated at 86. The spring 82 is preloaded so that the ratchet lever 74 normally is urged into engagement with a boss 88 carried by the housing 10. This boss is best seen by referring to FIGURE 3.

Referring again to FIGURE 1, the housing portion 10 is formed with an end face 90 to which the face of a peripheral portion 92 of a tailshaft extension housing 94 is secured, suitable bolts 96 being provided for this purpose. As best seen in FIGURES 3 and 4, this end face 90 has secured thereto a guide element 98. It is held in place by a retainer bolt 100. A pilot opening in the form of a slot 102 is formed in the element 98 at a location directly adjacent an opening 104 formed in the housing end face.

The pawl lever actuator includes a driver operated control rod 106. It includes a cam portion 108 having a generally semi-spherical cam surface 110. An elongated extension 112, which preferably is of a tapered cross section, extends through the pilot opening 102 in the guide element 98 and appropriately positions the cam portion 108 as it approaches the ratchet lever 74.

When the cam portion 108 assumes the position shown in FIGURE 3, it engages the heel 114 of the lever 60. The heel 114 rides over the cam surface 110 as the rod 106 is shifted in a right-hand direction as viewed in FIGURE 3. The pawl lever 60 then assumes a park position with the tooth 48 engaging the teeth 56 to lock the driven member 16 against rotation in either direction.

Movement of the rod 106 in a right-hand direction causes the cam surface 110 to ride over a cam surface 116 formed on the ratchet lever 74. As this occurs the cam surface 110 engages also a cam surface 118 formed on the heel 114.

If the tooth 58 is aligned with the space between two adjacent teeth 56, the pawl lever 60 will move under the influence of the caming action of the cam portion 108 as the rod 106 is advanced in a right-hand direction as viewed in FIGURE 3. If, however, the tooth 58 is positioned directly adjacent the major diameter part of a tooth 56, it will be impossible for the lever 60 to move toward the braking position. In this case the ratchet lever will be urged in a right-hand direction as viewed in FIGURE 3c to permit continued motion of the lever 106 in a right-hand direction as the vehicle operator continues moving the manually operable portion of the linkage mechanism to a position that normally would correspond to the braking position. This causes the spring 82 to yield and exert normally a pressure on the lever 60 that tends to urge it toward the braking position. When the driven shaft 16 moves slightly, the tooth 58 then is brought into registry with a space between two adjacent teeth 56 and the pawl lever 16 then snaps into place as the ratchet lever 74 again assumes the position shown in FIGURE 3.

In FIGURE 3A I have illustrated the relative position of the cam portion 108 with respect to the ratchet lever 74 and the heel 114 at a time immediately prior to the time that lever 60 begins to rotate toward the braking position. In a preferred embodiment of my invention this position of the rod 106 corresponds to the reverse drive position of the manually controlled selector valve of the automatic control valve sytem.

The other exteme position for the rod 106 is shown in FIGURE 3B. In this instance the extension 112 provides an end support for the rod 106 as the cam portion 108 moves away from ratchet lever 74. In a preferred embodiment of my invention, this position of the lever 106 corresponds to the so-called low speed forward drive range for the manually controlled selector valve of the control valve system.

The end of rod 106 is joined to one end 120 for a driver controlled rotatable lever 122. This lever is connected to a pivot shaft 124 that in turn may be received within an opening formed in a supporting boss that forms a part of the housing 10. The lever 122 can be oscillated about the axis 124 of the supporting shaft.

Movement of the lever 122 in a clockwise direction will cause movement of the rod 106 in a right-hand direction as viewed in FIGURE 3.

Referring next to FIGURES 6, 7 and 8, there is shown a parking brake mechanism of a modified design. The structure of FIGURES 6, 7 and 8 has parts that are common to the mechanism described with reference to FIGURES 1 through 5. These have been designated by corresponding reference characters although primed notations are used.

In the embodiment of FIGURES 6, 7 and 8, the end of rod 106 is offset at a right angle as indicated at 126. It rotatably journals a roller 128 which may be held in place by any suitable retainer means. Roller 128 is adapted to engage the heel 114' of the pawl lever 60'. A short stub shaft 130 is spot welded or otherwise secured to the end of rod 106. Its end may be formed at right angles to provide a journal for a second roller 132. This roller engages the roller 128 as indicated in FIGURE 7. Roller 132 engages also a ratchet plunger 134 having a conical cam surface 136. It is received within a cylinder 138 which is supported by a boss 140 in the housing 10. A ratchet spring 142 received within the cylinder 138 is adapted to urge the plunger 134 in a left-hand direction as viewed in FIGURE 7, and a spring anchor pin 144 carried by the cylinder 138 provides a reaction point for the spring 142.

During normal operation of the parking brake mechanism the rod 106' can be urged in a right-hand direction, as viewed in FIGURES 6 and 7, to move the pawl lever 60 toward the braking position. If the pawl tooth is aligned with a space between two adjacent teeth of the parking gear, roller 132 will ride over the conical cam surface 136 of the plunger 134. Similarly, the roller 128 will ride over the cam surface formed on the heel 114'. A minimum amount of friction is involved in this instance since there is no sliding action whatsoever between the cooperating brake elements, the rollers 128 and 132 being disposed in rolling contact. If, however, the tooth of the pawl lever is misaligned with respect to a space between two adjacent teeth of the parking gear, the ratchet spring 142 will yield thereby causing the plunger 134 to shift in a right-hand direction as the rod 106' is advanced in a right-hand direction as viewed in FIGURES 6 and 7. Upon subsequent movement of the driven member of the power transmission mechanism the parking pawl brake lever will snap into place under the influence of the spring pressure of spring 142. The plunger 134 normally is engaged with the adjacent part of the boss 140 and the spring 142 will not yield under those forces that are required to effect a shifting movement of the pawl lever.

In FIGURE 9 I have illustrated another modification of my invention. It includes a ratchet lever 74' that corresponds to the lever 74 of the embodiment of FIGURES 1 through 5. It includes also a pawl 60" that corresponds to the pawl lever 60 of the embodiment of FIGURES 1 through 5. The structure of FIGURE 9 includes rollers 128' and 132' that corresponds to the rollers 128 and 132 of the embodiment of FIGURE 7. These are carried by a rod and by a cooperating stub shaft of the type used in the embodiment of FIGURE 7 and which are illustrated in FIGURE 7 by reference characters 106' and 130.

In the embodiment of FIGURE 9 the rollers 132' will ride over cam surface 116' of the ratchet lever 74' during normal operation of the parking brake. When it assumes the position shown in FIGURE 9, the pawl lever 60" will have assumed the braking position. If the pawl tooth is misaligned with respect to the space between two adjacent teeth of the parking gear, however, a ratchet spring 82' will yield thereby allowing continued movement of the brake actuating linkage mechanism. Upon subsequent movement of the driven member of the mechanism, however, the spring force of spring 82' will snap the pawl lever 60" into the braking position as the ratchet lever 74' assumes the position shown in FIGURE 9.

Having thus described preferred embodiments of my invention, what I claim and desire to secure by U.S. Letters Patent is:

1. A positive acting brake mechanism for anchoring a rotary shaft to a relatively stationary structure comprising a brake gear secured to said shaft, a brake pawl mounted for oscillation into and out of engagement with said gear, said pawl having a heel portion formed thereon, a control rod mounted for movement in a direction generally parallel to the axis of said shaft, a cam portion carried by said rod, a ratchet member carried by said stationary structure and having a cam surface formed thereon, said cam portion being engageable with said cam surface and with said heel portion upon shifting movement of said rod in one direction thereby causing said pawl to lock said gear against rotation in either direction, means for mounting said ratchet member for limited movement, a fixed stop carried by said stationary structure, and ratchet spring means for applying a preload to said ratchet member to urge it against said stop, said ratchet spring being adapted to yield upon shifting movement of said rod in said one direction with a force that exceeds said preload.

2. A parking brake for an automatic power transmission mechanism, said mechanism being adapted to deliver torque from a driving member to a driven shaft, a parking gear carried by said driven shaft, said driven shaft being rotatably journaled in a relatively stationary housing, a pawl mounted on said housing for oscillation about an axis that is generally parallel to the axis of said shaft, a control rod mounted in generally parallel relationship with respect to said pawl axis, a cam carried by said rod, a heel portion formed on said pawl, a ratchet member mounted for limited oscillatory movement about an axis that is transverse to said pawl axis and having a cam surface formed thereon, a stop carried by said housing, a preloaded ratchet spring means for normally urging said ratchet member in one direction into engagement with said stop, said cam portion being engageable with said cam surface and said heel portion upon shifting movement of said rod in one direction to effect locking engagement of said gear and said pawl, said spring means being adapted to yield when the shifting effort applied to said rod exceeds a predetermined limit.

3. A parking brake for an automatic power transmission mechanism, said mechanism being adapted to deliver torque from a driving member to a driven shaft, a parking gear carried by said driven shaft, said driven shaft being rotatably journaled in a relatively stationary housing, a pawl mounted on said housing for oscillation about an axis that is generally parallel to the axis of said shaft, a control rod mounted in generally parallel relationship with respect to said pawl axis, a cam carried by said rod, a heel portion formed on said pawl, a ratchet member mounted for limited oscillatory movement about an axis that is transverse to said pawl axis and having a cam surface formed thereon, a stop carried by said housing, a preloaded ratchet spring means for normally urging said ratchet member in one direction into engagement with said stop, said cam portion being engageable with said cam surface and said heel portion upon shifting movement of said rod in one direction to effect locking engagement of said gear and said pawl, said spring means being adapted to yield when the shifting effort applied to said rod exceeds a predetermined limit, said spring means upon shifting movement of said ratchet member being adapted to exert a force upon said pawl tending to urge it into engagement with said gear.

4. A parking brake for an automatic power transmission mechanism, said mechanism comprising a torque delivery shaft rotatably journaled in a relatively stationary housing, a parking gear carried by said shaft, a parking pawl mounted on said housing for movement into and out of engagement with said gear, a control rod mounted in generally parallel relationship with respect to the axis of said shaft, a cam carried by said rod, a heel portion formed on said pawl, a ratchet member in the form of a plunger carried by said housing and adapted for movement in a direction generally parallel to the axis of said shaft, said ratchet member having formed thereon a cam surface, a stop carried by said housing, a preloaded ratchet spring means for normally urging said plunger in one direction into engagement with said stop, said cam portion being engageable with said cam surface and said heel portion upon shifting movement of said rod in a direction opposite to said one direction to effect locking engagement of said gear and said pawl, said spring means being adapted to yield when the shifting effort applied to said rod exceeds a predetermined limit.

5. A parking brake for an automatic power transmission mechanism, said mechanism comprising a torque delivery shaft rotatably journaled in a relatively stationary housing, a parking gear carried by said shaft, a parking pawl mounted on said housing for movement into and out of engagement with said gear, a control rod mounted in generally parallel relationship with respect to the axis of said shaft, a cam carried by said rod, a heel portion formed on said pawl, a ratchet member in the form of a plunger carried by said housing and adapted for movement in a direction generally parallel to the axis of said shaft, said ratchet member having formed thereon a cam surface, a stop carried by said housing, a preloaded ratchet spring means for normally urging said plunger in one direction into engagement with said stop, said cam portion being engageable with said cam surface and said heel portion upon shifting movement of said rod in a direction opposite to said one direction to effect locking engagement of said gear and said pawl, said spring means being adapted to yield when the shifting effort applied to said rod exceeds a predetermined limit, said spring means upon shifting movement of said ratchet member being adapted to exert a force upon said pawl tending to urge it into engagement with said gear.

6. A positive acting brake mechanism for anchoring a rotary shaft to a relatively stationary structure comprising a brake gear secured to said shaft, a brake pawl mounted on said stationary structure for movement into and out of engagement with said gear, said pawl having a heel portion formed thereon, a control rod mounted for movement in a direction generally parallel to the axis of said shaft, a cam portion carried by said rod, a reaction member carried by said stationary structure and having a cam surface formed thereon, said cam portion being engageable with said cam surface and with said heel portion upon shifting movement of said rod in one direction thereby causing said pawl to lock said gear against rotation in either direction, said cam portion comprising a pair of round members rotatably mounted on said rod, said round members being in rolling contact with each other, one round member being adapted for rolling movement over said cam surface and the other round member adapted for rolling contact with said heel portion upon shifting movement of said rod in said one direction, said reaction member being in the form of a ratchet mounted for limited movement upon said stationary structure, and preloaded spring means for normally biasing said ratchet into engagement with a portion of said stationary structure, said spring means being adapted to yield when the shifting effort applied to said rod exceeds a predetermined limit.

References Cited by the Examiner
UNITED STATES PATENTS

| | | | |
|---|---|---|---|
| 2,875,856 | 3/59 | Mrlik | 188—69 |
| 2,974,752 | 3/61 | Howard | 188—69 |

MILTON BUCHLER, *Primary Examiner.*

ARTHUR L. LA POINT, *Examiner.*